Jan. 20, 1953   Q. FRAZIER   2,625,743
CLOUD HEIGHT INDICATOR

Filed Sept. 5, 1950   2 SHEETS—SHEET 1

INVENTOR.
QUENTIN FRAZIER

BY Harry M. Saragovitz
Attorney

Jan. 20, 1953   Q. FRAZIER   2,625,743
CLOUD HEIGHT INDICATOR
Filed Sept. 5, 1950   2 SHEETS—SHEET 2

INVENTOR.
QUENTIN FRAZIER
BY Harry M. Saragovitz
Attorney

Patented Jan. 20, 1953

2,625,743

UNITED STATES PATENT OFFICE 2,625,743

CLOUD HEIGHT INDICATOR

Quentin Frazier, Red Bank, N. J., assignor to the United States of America as represented by the Secretary of the Army Application September 5, 1950, Serial No. 183,218

5 Claims. (Cl. 33—71)

(Granted under Title 35, U. S. Code (1952), sec. 266)

The invention described herein may be manufactured and used by or for the Government for governmental purposes, without the payment of any royalty thereon.

The present invention relates to instruments for measuring the height of clouds and more particularly for mechanically determining cloud heights from moving airplanes.

The said invention is well adapted for obtaining a height in space where the base line is known, or for determining a base line in space where the height is known, for any relative motion in parallel planes. Although it will be understood that the present invention is not limited thereto, said invention will be illustrated herein by an embodiment which is used for determining differences in altitude between airplanes and clouds.

It is an object of the present invention to provide a means whereby the vertical distances in space between two bases which are moving relative to each other may be measured.

It is a further object to provide such a device which is relatively simple and rapid in operation and whereby the desired results may be obtained by relatively simple mathematical calculations.

It is still a further object to provide a device whereby the difference in altitude between an airplane moving along a level course at a known air speed, and a cloud, either above or below it, may be readily and quickly calculated.

This and other objects and advantages of the present invention will be better understood as the detailed description therewith progresses.

In the accompanying specification there is described, and in the annexed drawings shown, what is considered a preferred embodiment of the present invention. It is, however, to be understood that the present invention is not limited to said embodiment. Other objects and advantages of the present invention will appear throughout the following specification and claims.

In the drawings,

Fig. 3 is a diagram showing the geometrical relationships upon which the invention is based.

Figure 1:
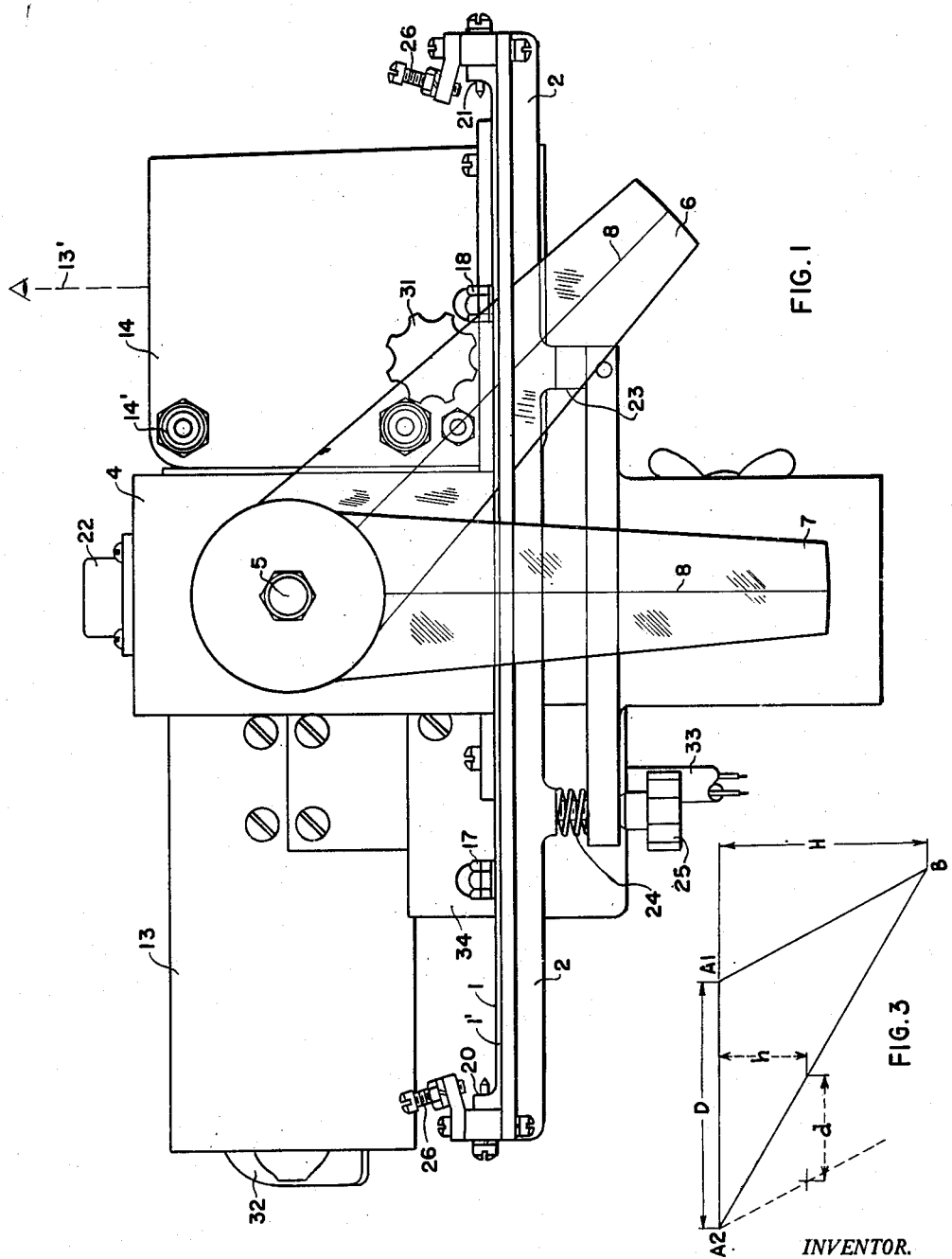
Fig. 1 is a front view of a cloud height indicator embodying the present invention, the parts shown in their relative positions during the tracking of a cloud located below the airplane in which the instrument is positioned.
Figure 2:
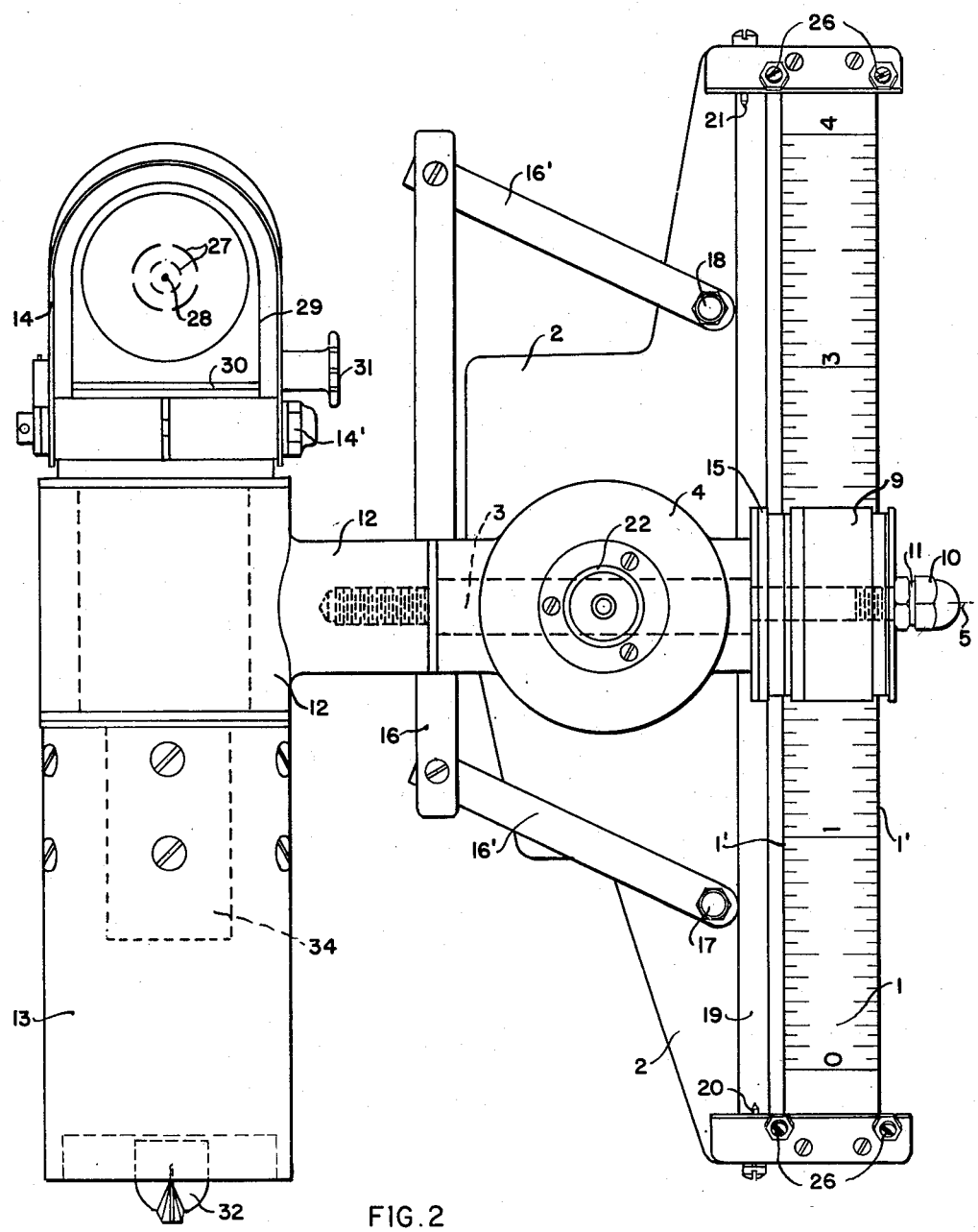
Fig. 2 is a top view of the cloud height indicator shown in Fig. 1.

Referring now more particularly to the drawings, the cloud height indicator illustrated in Figs. 1 and 2 consists of a single elongated linear scale 1 graduated in four units each 2" long. The units are in turn subdivided into twentieths. The ends of this scale 1 are rigidly attached to the base member 2 of the indicator, and the scale 1 sits longitudinally flat side up. A main shaft 3 is free to rotate in two bearings (not shown) set in the body 4 of the instrument at right angles to the scale 1. The center line 5 of the main shaft 3 is located 2" above the graduated surface of the scale 1.

Referring now more particularly to Fig. 3, point A1 represents the initial position of the first object A, at which point the cloud height indicator is initially located. B represents the fixed object, whose vertical distance from A is to be ascertained. H is the vertical distance between A1, the initial location of object A and object B; $h$ is the indicator height which is the distance that the main shaft 3 is located above the graduated surface of scale 1. D is the distance the two objects A and B move relative to each other until object A is in position A2. Since the indicator is now located at point A2, linear distance $d$ is the length of the swing or "swing distance" between the two fiducial indicator arms representing the initial and final position of object A.

If it is desired to measure the vertical distance H between the two objects A and B, located respectively in two spaced horizontal planes, one of which objects is moving in a straight line relative to the other, a calculator embodying the present invention may be positioned at one of the objects, such as at A. Such a calculator includes sighting means adapted to be directed at the second of the objects, namely B, during such relative movement. The sighting means is swingable about a pivot located in the plane of the first object A, and there is provided a scale adapted to measure the length of the swing which is the "swing distance" $d$ of the sighting means along the straight line, which line is disposed in a horizontal plane located at a known fixed vertical distance, which is the "indicator height" $h$, either above or below the pivot point. If the second object B is sighted for a certain length of time T and the "swing distance" $d$, through which the sighting means is swung during the time, and the distance D the two objects A and B move relative to each other during the time it takes object A to reach position A2 are ascertainable, then the vertical distance H between the pivot point (which is in the plane of the object A) and the second object B may be readily calculated.

More specifically, assume an airplane flying along a straight horizontal air course at a known constant speed S above a particular cloud. If an instrument embodying the present invention is positioned in the airplane, and, at a certain instant of time the cloud is sighted through the sighting means of the indicator and the cloud is then tracked by the sighting means for a length of time T, which is clocked, and the "swing distance" $d$ through which the sighting means is swung during the time is determined, then the "indicator height" $h$ is to the vertical distance H between the airplane and the cloud as the "swing distance" $d$ is to the air distance D flown by the airplane. As the air distance D flown by the airplane may be found from its known speed S and the clocked time T, it is readily appreciated that the vertical distance H between the airplane and the cloud may be easily calculated. It will be understood that the same principle may be similarly applied where an airplane is below the cloud and where it is desired to ascertain the height of an object above the vehicle moving on the ground, etc.

Two transparent indicator arms 6, 7 radiate from the main shaft 3, and bear on either fiducial edge 1' of the scale 1. A fine line 8 is provided on each indicator 6, 7 lengthwise to serve as a fiducial mark. An indexing disc 9 is keyed to the main shaft 3 so that it rotates with the shaft 3 and is free to slide axially. This feature provides for adjustment of the friction in the rotation of the shaft by means of a retaining nut 10 and washers 11 at the end of shaft 3. The disc mechanism 9 fixes the exterior indicator arm 7 at either of two positions 180° apart by means of cooperating detent means (not shown) that are provided at the two positions for indexing the exterior indicator arm 7 at two positions 180° apart as the main shaft 3 is rotated.

A yoke 12 is mounted on the other end of the main shaft 3. A sight assembly 13, 14 is fitted into the yoke 12 and is free to rotate as the yoke 12 is rotated on the main shaft 3. The sight assembly 13, 14 also rotates in the yoke 12. Said sight assembly is so mounted that the plane described by the line of sight 13' as the assembly is rotated is parallel to the fiducial line 8 of the exterior indicator arm 6.

The interior indicator arm 6 is held in place by frictional engagement with a spring washer 15 so that it rotates with the shaft 3 unless restrained by some external member. A brass bar 16 is positioned parallel to the scale 1, and is connected at each end to two lever arms 16'. The lever arms 16' are so connected to the base plate 2 at the pivot points 17, 18 that as the bar 16 is thrust longitudinally forward and backward, said bar will pivot eccentrically about the two points 17, 18. This bar 16 and lever arms 16' serve as a clamp capable of holding the interior indicator arm 6 in any pre-determined position on the scale 1. The bar 16 actuates a cam lever 19 pivoted on the base member 2 at 20 and 21, so that when pressure is applied to lever 19 by longitudinally thrusting the bar 16 until the perpendicular distance between the bar 16 and cam lever 19 is the greatest (backward thrust), the friction between the lever and the interior indicator arm 6 will hold arm 6 rigidly in a fixed position. Arm 7 is released by an opposite forward thrust of bar 16.

A circular type spirit level 22 is mounted on the main column 4 of the instrument to provide for adjustment during flight. One end 23 of the base member 2 is hinged and the other end 24 is supported by a levelling screw 25. The levelling adjustment is made by manipulating the levelling screw 25. Zero adjustment screws 26 are provided on each of the longitudinal ends of scale 1 for aligning the zero mark on the scale with the fiducial line 8 on the exterior indicating arm, the fiducial line on the interior indicating arm being subsequently aligned with the zero mark on the scale.

The illuminated sight 13 used in this indicator is a modified U. S. Navy Mark IX with a 28 volt lamp (not shown). The sight 13 projects concentric rings 27 with a spot 28 at the center into the sighting hood 14. The sight 13 is fastened through the yoke 12 to the sighting hood 14 by tightening nut 14'. A filter 29 which is swingable on axis 30 as the knob 31, is turned, may be interposed at the point of sight for use against particularly bright objects. The knob 32 is provided to vary the voltage of a rheostat (not shown) for controlling the brightness of the lamp and thus the brightness of the image projected into the sighting hood. The lamp socket (not shown) and connections from inlet cord 33 are located in the housing 34 which is connected to the body of the illuminated sight 13.

In the operation of the cloud height indicator just described, it is assumed first that the indicator is sustained in an airplane in a position where clouds at a lower altitude are visible through a window or suitable opening. The indicator may be installed at any station in any airplane providing that there is sufficient visibility above and below the airplane and access to a 27 volt power outlet. The instrument should be positioned so that the plane of the base member 2 is suitably levelled for the fore and aft trim of the airplane at the particular time where a measurement is to be made. The pilot should be instructed to maintain a constant and level course through the air at a constant air speed to maintain the same fore and aft trim and to maintain the plane level laterally during the use of the indicator.

Cloud heights are determined by following the procedure outlined below:

The operator first records the indicated air speed, true air temperature, and pressure altitude of the airplane. He then lines up the zero mark on the scale with the fiducial line 8 on the exterior indicating arm, the fiducial line on the interior indicating arm being subsequently aligned with the zero mark on the scale. When necessary, the adjustment screws 26 are screwed in or out to provide for this zero adjustment. The operator next selects a reasonably small, well defined cloud feature and sights down through the sighting hood 14 at this cloud feature. He locks the interior indicator arm 6 in a fixed position by moving the clamping bar 16. At the beginning of tracking the cloud, the operator trips a stop watch. The cloud is then tracked through the sighting hood 14 for a suitable time. At the instant that tracking of the cloud feature is completed, two things are done: the watch is stopped and the elapsed time and indicator readings are recorded where the fiducial lines 8 of both the interior and exterior indicator arms 6, 7 lie on the scale 1. It is important for accurate results that at least at the instant the stop watch is started and the instant it is stopped, the cloud feature be centered in the sighting hood 14 at the point of the projected spot 28. During the balance of the tracking it is only essential that the cloud be not lost.

The lower indicator reading is then subtracted from the higher reading. The true air speed and corrected altitude of the airplane are calculated. The next calculation is of the vertical distance H between the airplane and cloud feature by substituting in the equation $$H = \frac{hST}{.680d}$$

In the above equation, $h$ represents the "indicator height" as already defined at the beginning of the specification, which is the vertical distance between the center 5 of the axis 5 of the main shaft 3 and the surface of the scale 1. $d$ represents the "swing distance" or the distance along the scale 1 measured during the tracking operation. S represents the true air speed of the airplane and T the time of the tracking operation, as shown by the stop watch. Thus, ST indicates the air distance traversed by the airplane during the tracking operation. H represents the difference in altitude between the airplane and the cloud which was tracked. In actual practice H and ST may be in any units as long as they are the same units, thus for convenience they may be in feet. $h$ and $d$ may likewise be in any units as long as they are the same. For convenience they may be in inches. In the design of the above described indicator, the distance $h$ is 2" the scale 1 is divided into units of 2" lengths. Therefore, in the formula, $$\frac{h}{d}$$

are the same units and $h$ is equivalent to unity. It, therefore, may be eliminated from the equation. The constant .680 is arrived at by converting the air speed in miles per hour to feet per second. Therefore, the equation to be used from the readings taken by the operator is $$H \text{ (feet)} = \frac{ST}{.680d}$$

It will be understood that an indicator having a convenient distance $h$ between the axis of the main shaft 3 and the vertical distance to the surface of the scale 1 will be operable as long as the scale 1 is calibrated in multiples of said distance $h$. From the last equation above, it is seen that the vertical distance H between the airplane and the cloud is equal to the true air distance (ST) traveled by the airplane during the tracking operation, divided by the constant .680 times the swing distance ($d$) of the difference in readings taken as indicated by the interior and exterior indicator arms at the end of the tracking operation on the scale 1.

The cloud height indicator described above may also be used to measure the vertical distance to a cloud position at a higher altitude than the airplane. The instrument must then be positioned below a window or opening at the top of the airplane so that suitable visibility for tracking in an upward direction is obtained, and it should be positioned high enough so that any operator may stand or sit below the instrument and track clouds by looking upward through the sighting hood 14. In such operation the sighting hood is rotated through a 180° angle from the position in which it was used in tracking a cloud below the airplane, and by thus rotating the hood on the main shaft, the exterior indicator arm 6 is locked by the cooperating detent means on the indexing disc 9.

The operation used in finding the distance of clouds above the airplane is identical to that described in finding the height of clouds below the airplane. After either operation the cloud height is determined by using the corrected altitude of the airplane: when the cloud is below the airplane, it is necessary to subtract the vertical distance calculated by using the indicator from the corrected altitude; when the cloud is above the airplane, the calculated value must be added to the corrected altitude.

While there has been described what is considered to be a preferred embodiment of the invention, it will be obvious to those skilled in the art that various modifications and changes may be made therein without detracting from the spirit of the invention, and it is, therefore, aimed in the appended claims to cover all such changes and modifications as fall within the true spirit and scope of the invention.

What is claimed is:

1. In a cloud height indicator, supporting means, linear scale means connected to said supporting means, a rotatable main shaft mounted on said supporting means, said main shaft being in a plane parallel to and spaced from said scale means, two indicator arms having fiducial lines thereon radiating from said main shaft in spaced parallel planes perpendicular to said linear scale means, said indicator arms being so positioned that said fiducial lines lie adjacent to the fiducial edges of said scale means, an indexing disc keyed to the main shaft between said indicator arms, two cooperating detent means to lock one of said indicating arms to said disc in two fixed positions, releasable means to hold one of said indicator arms in any predetermined position while the other is free to rotate with said main shaft, a sight assembly rotatably mounted on said main shaft, said sight assembly being also free to rotate on a perpendicular axis intersecting the axis of said main shaft.

2. In a cloud height indicator, a base plate, means to support said base plate, an elongated scale longitudinally positioned on said base plate, supporting means for sustaining a rotatable main shaft, said main shaft being in a plane parallel to and spaced from said scale, two indicator arms radiating from said main shaft in parallel planes and spaced to indicate readings on either fiducial edge of said scale as the main shaft is rotated, an indexing disc keyed to the main shaft between said indicator arms, two cooperating detent means to lock one of said indicating arms to said disc in two fixed positions, releasable clamping means to hold one of said indicator arms in any predetermined position while the other is free to rotate with the main shaft, a sight assembly mounted on said main shaft, said sight assembly being free to rotate on the axis of said main shaft and about a perpendicular axis intersecting the axis of said main shaft.

3. In a cloud height indicator, a base member, levelling means to position said base member, supporting means connected to said base member, a calibrated flat elongated scale longitudinally positioned flat side up on said base member, a main shaft rotatable relative to said supporting means, said main shaft being in a plane parallel to and spaced from said scale, interior and exterior transparent indicator arms radially connected to said main shaft, each of said indicator arms having a fiducial line marked lengthwise thereof, said fiducial line being radially and perpendicularly disposed relative to the axis of said main shaft, said interior and exterior indicator arms generating parallel spaced planes as the main shaft rotates and being adjacent to and opposite the fiducial edges of said scale, an indexing disc keyed to the main shaft between said indicator arms, said disc being rotatable with said main shaft and free to slide axially, two cooperating detent means to lock said exterior indicator arm to said disc in two positions 180° apart, releasable clamping means mounted on said base member to hold said interior indicator arm in any predetermined position, said interior indicator arm being in releasable frictional engagement, a yoke secured to said main shaft for rotation therewith, a sight assembly sustained by said yoke and rotatable relative to said yoke about a perpendicular axis intersecting the axis of said main shaft, the line of sight through said sight assembly being in a plane parallel to the fiducial line on said exterior indicator arm at all operating positions of said sight assembly.

4. In a cloud height indicator as defined in claim 3, the calibrations upon said scale being in multiples of the vertical distance between said scale and the center of the axis of said main shaft.

5. In a cloud height indicator as defined in claim 3, zero adjustment screws on each of the longitudinal ends of said scale for moving said scale until a given mark on said scale corresponds with said fiducial lines.

QUENTIN FRAZIER.

REFERENCES CITED

The following references are of record in the file of this patent:

UNITED STATES PATENTS

| Number | Name | Date |
|---|---|---|
| 539,675 | Donnan | May 21, 1895 |
| 1,720,963 | Metcalf | July 16, 1929 |
| 1,740,255 | Lovelace | Dec. 17, 1929 |

FOREIGN PATENTS

| Number | Country | Date |
|---|---|---|
| 28,524 | Norway | Jan. 21, 1918 |